United States Patent [19]

Rozniecki

[11] Patent Number: 4,655,087
[45] Date of Patent: Apr. 7, 1987

[54] TEMPERATURE-COMPENSATED PRESSURE GAGE

[76] Inventor: Edward J. Rozniecki, 31041 Angeline, St. Clair Shores, Mich. 48082

[21] Appl. No.: 767,099

[22] Filed: Aug. 19, 1985

[51] Int. Cl.⁴ .................. G01L 7/06; G01L 19/04
[52] U.S. Cl. .............................. 73/708; 73/716
[58] Field of Search .................. 73/708, 716–729, 73/753, 49.3, 52

[56] References Cited

U.S. PATENT DOCUMENTS

| | | | |
|---|---|---|---|
| 2,300,810 | 11/1942 | Robins | 73/708 |
| 2,662,757 | 12/1953 | Mock | 73/708 |
| 3,946,175 | 3/1976 | Sitabkhan | 73/729 |

Primary Examiner—Donald O. Woodiel

[57] ABSTRACT

A fire suppression bottle having a state-of-change indicator constructed to include two separate bellows arranged in opposed relationship. Each bellows is isolated from the other bellows, such that failure of either bellows has a fail-safe effect. The use of springs or other mechanisms that would affect the accuracy of the indicator is avoided.

5 Claims, 2 Drawing Figures

TEMPERATURE-COMPENSATED PRESSURE GAGE

GOVERNMENT INTEREST

The invention described herein may be manufactured, used, and licensed by or for the Government for governmental purposes without payment to me of any royalty.

BACKGROUND AND SUMMARY OF THE INVENTION

This invention relates to a temperature-compensated fluid pressure indicator. A principal intended use of the invention is as a state-of-charge indicator for fire suppression bottles. Such bottles are commonly used in military land vehicles (tanks, personnel carriers, etc.) or aircraft to suppress explosive-type fires or slow growth fires.

Explosive type fires can occur in military vehicles when an enemy projectile ruptures the fuel tank on board the vehicle. The fire suppression bottle(s) within the vehicle contains a quantity of liquid fire extinguishant (e.g., three pounds) under relatively high pressure (e.g., 750 p.s.i.); the liquid extinguishant is commonly Halon-1301 (bromotrifluoromethane). The bottle is equipped with a fast-acting solenoid valve or explosive squib-actuated valve that is electrically connected to an electrical power supply controlled by a fast-acting optical detector responsive to generation of flame in or near the vehicle's fuel tank. The fire-suppression system is designed so that from the onset of the flame, the entire contents of the bottle are automatically discharged within about 100 miliseconds. No human actuation effort is required.

Military vehicles are also commonly equipped with portable manually-operated fire suppression bottle units for handling slow growth fires. Such portable bottle units are (or may be) charged with Halon-1301 (by the same procedures used to charge the bottles in the automatic systems).

Moderately fast-acting fires can occur in the engine compartments of vehicles due to engine malfunction. The described automatic bottle systems can be used to suppress such fires. Manually-operated bottle units are not usually effective on engine compartment fires because it is difficult to gain access to the compartment in sufficient time.

Slow growth fires can be generated in military vehicles due to fuel/oil spills, electrical spark generation, inadvertent use of matches, enemy action, etc. Such fires can be suppressed with manual hand-held fire extinguisher bottles controlled by manual discharge valves. As noted above, such bottles can be charged with Halon-1301 under pressure, using the same charging procedures as are used to charge the automatic bottles.

A preferred fire extinguishant is Halon-1301 (bromotrifluoromethane); the usual pressurizing agent is nitrogen. In most cases, the bottle is a single chamber bottle having a wall thickness sufficient to withstand expected internal pressures on the order of 700-800 p.s.i., at 70° F., and substantially higher pressures at temperatures approaching 160° F. The Halon-1301 may be charged into the bottle on a weight bases (e.g., three pounds, five pounds, fourteen pounds, etc., depending on the bottle size); thereafter the pressurizing agent may be introduced from a high pressure source into the bottle until the internal bottle pressure is at a satisfactory level, e.g., 750 p.s.i. During the pressurizing process, it may be necessary to agitate the bottle to promote mixing of the nitrogen and Halon-1301; otherwise some of the nitrogen may undergo delayed dissolving in the Halon, thereby reducing the effective bottle pressure during the standby period (prior to the instant when the bottle system is used to suppress a fire).

Military vehicles using these bottle systems may at times be subjected to relatively high temperatures at or near 160° F. (e.g., in desert atmospheres); at other times such vehicles may be subjected to relatively low temperatures at or near minus 65° F. (e.g., in arctic temperatures). The temperature extremes can cause significant pressure changes within the bottles. The bottles are usually provided with pressure-relief valves designed to vent excess pressure out of the bottles. Escape of the Halon can also take place through seals and other minute openings in the bottle walls and/or valve joints. The Halon-1301 is a vaporizable liquid having a relatively low boiling point such that when excess pressure is vented from the bottle, some of the pressurizing gas escapes along with the Halon.

In a typical bottle system containing seven pounds of Halon, the weight of nitrogen would be about 0.28 pounds. The Halon partial pressure at 70° F. would be about 188 p.s.i., and the nitrogen partial pressure would be about 562 p.s.i.; total system pressure would be 750 p.s.i. (at 70° F.).

Loss of Halon (or nitrogen), or initial undercharging of Halon (or nitrogen) into the bottle, is disadvantageous in any bottle system (automatic or manual). The loss of Halon is disadvantageous in that less Halon is available for fire suppression purposes. The Halon loss means potentially inadequate coverage of the flame and/or inadequate pressure to achieve satisfactory discharge of the extinguishant within the desired time interval (e.g., 100 miliseconds). Lack of nitrogen in the bottle translates into an unsatisfactory discharge pressure.

The present invention is directed to a pressure indicator designed to detect possible loss or non-presence of fire extinguishant (e.g., Halon-1301) and pressurizing agent from a fire suppressant bottle during the standby period after initial charging of the bottle. The pressure indicator is constructed so that the effects of ambient temperature change are taken into account, i.e., compensated. The principal aim of the invention is to provide a device that indicates the state-of-charge of the associated bottle, i.e., the mass of Halon and pressurizing agent within the bottle. The term "temperature compensation" is here used to convey the idea that the indicator will automatically subtract from the pressure reading any pressure increase due to temperature increase, or add to the pressure reading any pressure decrease due to temperature decrease taking place after the initial bottle-charging process (usually at or about 70° F.). The output or final reading of the indicator device will be related to the mass of pressurizing gas and liquid extinguishant in the bottle, i.e., the state-of-charge of the bottle, and its ability to suppress a fire.

The present invention may be considered an improvement or variant on a state-of-charge indicator disclosed in U.S. Pat. No. 3,946,175 issued to A. N. Sitabkhan on Mar. 23, 1976. That patent shows an indicator wherein temperature-compensation is provided by the use of a small reservoir 6 containing a fluid that has the same pressure-temperature response as the fluid charged into the bottle. A bellows 32 has its interior exposed to the pressure existing within the bottle; the external space surrounding the bellows communicates with the aforementioned reservoir 6, such that motion of the bellows is related to the pressure differential across the bellows, i.e., pressure in the space within the bellows versus the pressure in the space surrounding the bellows and the combined pre-loads and spring rates of the bellows and spring 42.

In the device disclosed in U.S. Pat. No. 3,946,175, the effect of temperature on the bellows is at least partially compensated because both atmospheres (within and outside the bellows) are exposed to a common temperature. In this sense, the device of U.S. Pat. No. 3,946,175 corresponds to my proposed device. However my invention overcomes an "unbalanced-pressure" problem that I believe exists with the device disclosed in the referenced patent.

In the Sitabkhan patent any unbalanced bellows condition is aggravated by the presence of spring 42 which is designed with an inside coil diameter that prevents bellows expansion that could damage the bellows 32. It is considered poor practice to guide a spring on anything except a smooth surface. The bellows certainly does not meet this criteria. The Sitabkhan device is believed to provide only a partial (imperfect) temperature-compensating effect.

The structural arrangement proposed in the Sitabkhan patent is also believed to be disadvantageous in the sense that the indicator mechanism is mounted within the fire suppressant bottle (tank). With such a location the mechanism tends to be rather large because the switch or mechanical part of the mechanism is at least partially outside the bottle, whereas the fluid pressure part of the mechanism is within the bottle. The mounting hole (aperture) in the bottle side wall forms a potential leakage path. The bottle wall is curvilinear, such that it is difficult to form flat seal surfaces thereon. The assembly tends to be rather complicated.

The arrangement proposed in the Sitabkhan patent includes a sealed reed switch 54 mounted within a stationary hollow post 48 having a sealed connection with the wall of the fire suppressant bottle. I propose an arrangement that obviates the need for special sealing mechanisms of the type contemplated in the Sitabkhan patent.

My proposed indicator system is believed to at least partially overcome problems inherent in the system of U.S. Pat. No. 3,946,175. I propose to use two similarly-constructed bellows arranged in axial alignment with one another; one bellows has its interior space communicating with the bottle interior, while the other bellows is a sealed bellows whose interior space is charged with a pressurized vaporizing liquid having the same pressure-temperature characteristic as that of the bottle charge. The use of two bellows would, it is believed, overcome sealing problems and problems relating to erratic coil spring forces inherent in the device of U.S. Pat. No. 3,946,175. I propose an indicator device that is self-contained and mountable externally of the associated fire suppressant bottle, no machining or other treatment of the bottle is required to accommodate the indicator device thereon.

THE DRAWINGS

Figures 1, 2:
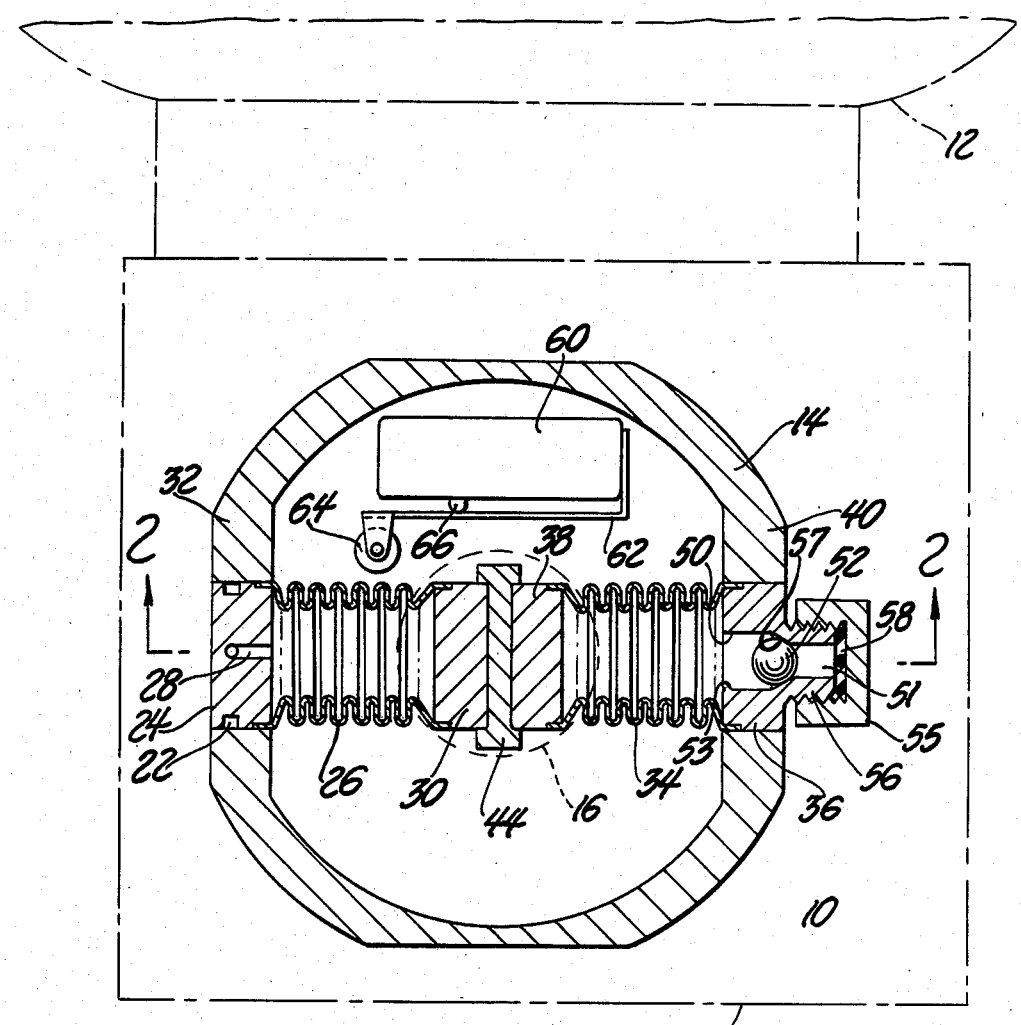
FIG. 1 is a sectional view taken through an indicator embodying my invention.
FIG. 2 is a sectional view on line 2—2 in FIG. 1.

Referring more particularly to the drawing, there is shown a state-of-charge indicator 10 for a fire suppressant bottle 12 (indicated in dashed lines). The indicator comprises a housing 14 having a threaded stem 16 adapted to screw into a threaded opening in a side surface of a discharge valve 18 located at the neck end or bottom of bottle 12. The threaded opening is located upstream from the valve element (within valve 18) such that when housing 14 is in its installed position, a passage 20 within the housing communicates with the bottle interior. When the bottle is charged with a vaporizable liquid extinguishant (such as Halon-1301) at a suitable pressure (e.g., 750 p.s.i.) the pressure in passage 20 will correspond to the pressure within the bottle.

Passage 20 connects with an annular groove 22 formed in an end wall 24 of a metallic bellow 26. A passage 28 leads from groove 22 to the interior space within the bellows. The other end wall 30 of the bellows is imperforate. Axially thickened end wall 24 of the bellows is snugly received in a circular opening in housing end wall 32; soldering, brazing or welding operations may be used to secure and seal bellows end wall 24 circumferentially to housing wall 32. The bellows assembly is fabricated prior to installation in housing 14.

A second sealed bellows 34 is located within housing 14 in axial alignment with bellows 26. The second bellows includes an axially thickened end wall 36, metallic convolution side wall, and imperforate end wall 38. Bellows end wall 36 seats within an opening in housing end wall 40; soldering, welding or brazing operations may be used to affix and seal bellows end wall 36 to the indicator housing.

The two bellows are of identical construction as regards such features as length in the free state, number of convolutions, effective area (diameter), and spring rate (if any). Also, the second bellows 34 is charged with a pressurizing vaporizable liquid similar to the liquid that is charged into bottle 12. The pressurizing bellows are operatively connected to a floating indicator element 44 located between the bellows end walls 30 and 38. A pointer 46 may be carried on element 44 to denote its position relative to a stationary dial plate 48; a slot 49 is provided in plate 48 to accommodate pointer motion in the directions denoted by arrows 52.

Indicator element 44 is shown as a floating wall or plate entirely unconnected to housing 14. However, the indicator element could be a lever swingably attached to housing 14, or a slidable element movable on tracks carried by the housing.

The bellows arrangement is such that when the pressure within bellows 34 is greater than the pressure within bellows 26, indicator element 44 will be shifted to the left (FIG. 2). When the pressure within bellows 26 is greater than the pressure within bellows 34 indicator element 44 will be shifted to the right. The shifting motion (right or left) will continue until the opposing forces generated by the two bellows are equalized. The controlling forces are the pressures within the respective bellows; no external springs are utilized to oppose or act with the fluid pressure forces.

Bellows 34 contains a pressurized vaporizable liquid that is preferably the same liquid utilized in bottle 12 (e.g., Halon-1301). Also, the pressure within bellows 34 is the same as the bottle charging pressure, e.g., 750 p.s.i. When bottle 12 and bellows 34 are both properly charged, the two bellows 26 and 34 are in the same state of expansion (or contraction); indicator element 44 is in a generally centered position spaced equal distances from housing end walls 32 and 40, as shown in the drawings.

Bellows 34 is equipped with a port 50 in its end wall 36 to facilitate the bellows charging operation; a small deformable sphere (ball) 52, formed for example of polyamide or other plastic is located within port 50 to seal against outflow of fluid after the charging operation. Sphere 52 acts as a check valve. End wall 36 is upset at 53 to form a cage for trapping sphere 52 within port 50.

To provide seal redundancy and insurance against ball seal 52 failure, the bellows may be equipped with a sealing cap 55. Cap 55 is threaded onto wall extension 56 so that elastomeric or non-metallic sealing disk 58 is compressed against the end surface of extension 56. Any vapor leaking from the bellows interior across sphere 52 will be prevented from escape, due to the second seal 58, 55.

Housing 14, and the associated bellows 26 and 34, are relatively small in comparison to the size of bottle 12. In a typical installation each bellows might have a diameter on the order of one quarter to one-half inch.

PROCEDURE FOR CHARGING BELLOWS 34

Bellows 34 may be charged before installation thereof into housing 14. With cap 55 removed from end wall extension 56, a valved source of liquid extinguishant is connected to wall extension 56, thereby enabling inflow of vaporizable liquid through passage 51, around ball 52 and through port 50; fluid flows around the ball and along the port 50 surface, displacing the ball leftwardly against upset portion 53. Bellows 34 is expanded until indicator element 44 abuts stop surface 45 in housing 14. The liquid vaporizes as it flows into the bellows, thereby producing a superatmospheric condition within the bellows.

When the bellows is pressurized and charged to a predetermined weight value, the flow of liquid extinguishant to halted. Ball 52 automatically moves rightwardly to seal against shoulder 57. Subsequently nitrogen (pressurizing agent) is introduced into bellows 34 from a remote source, using passage 51 as the entry point. Flow of nitrogen is stopped when the bellows reaches a total weight representing a desired mass of nitrogen. After the charging operation, cap 55 with seal 58, is applied to wall extension 56.

PROCEDURE FOR CHARGING BELLOWS 26

Bellows 26 is charged during, or incidental to, the process of charging bottle 12. Bellows 34 may, or may not, be in place in housing 14 while bellows 26 is being charged. Preferably bellows 34 is in place while bellows 26 is being charged. In any event, bellows 26 is charged after (not before) its installation in housing 14.

Bottle 12 is initially charged with vaporizable liquid extinguishant and gaseous pressurizing agent through a small filler valve (not shown) mounted on discharge valve 118; during the charging process some of the pressurized extinguishant flows through passage 20 into bellows 26. Prior to the bottle charging operation a vacuum may be applied through the filler valve, to facilitate inflow of liquid extinguishant to the bottle and to bellows 26 during the charging operation.

Liquid extinguishant is usually introduced to bottle 12 on a weight basis, e.g., three pounds, five pounds, etc.,; during the liquid addition process the bottle (with valve 18 and indicator 10 attached thereto) is weighed. Liquid addition is stopped when the desired weight increase is achieved; the liquid initially vaporizes after introduction into the bottle, and at a predetermined weight changes to liquid, thus producing a liquid-vapor equilibrium within the bottle and associated bellows 26. When a desired vapor-liquid mass has been added to the bottle, a gaseous pressurizing agent (nitrogen) is introduced by weight through the filler valve.

During the charging process, bellows 26 undergoes a pressurization action, thereby producing a motion of element 44 in a left-to-right direction. Assuming the other bellows 34 is in a proper pressurized state when bottle 12 is being pressurized, the deflected position of element 44 may be used to indicate or verify a fully pressurized condition of the bottle. During the pressurization process the pressure in bellows 26 increases toward the desired value, representative of a fully charged bottle; bellows 26 expands toward the condition shown in the drawings. At the same time, bellows 34 contracts toward its illustrated condition; during this process the pressure in bellows 34 is raised toward a desired value, e.g., 750 p.s.i. When the bottle is in a fully charged condition, the pressure in bellows 34 will be the same as the pressure in bellows 26, e.g., about 750 p.s.i. Indicator element 44 will be in a position approximately centered (midway) between housing walls 32 and 40. The charging process is preferably controlled (i.e., stopped) when a predetermined weight of gas has been added to the bottle system.

The illustrated bottle system may be installed in a military vehicle for suppressing fires that might occur therein, through enemy action or by accident. Such a vehicle can be located at times in desert areas (vehicle storage) where the temperature can get as high as 160° F. At other times the vehicle can be located in arctic atmospheres where the temperature can drop down to as low as about minus 50° F. During transitions between these temperature extremes, the fluid within the bottle system expands or contracts, thereby raising or lowering the fluid pressures in the two bellows 26 and 34.

It is intended that the fluid within bellows 34 will have the same pressure-temperature response as the fluid within bellows 26. Assuming both bellows have the same effective area, ambient temperature changes should have no effect on the bellows positions if the bottle system is non-leaking and installed in a bottle neck-down or valve down position (full of liquid). Indicator element 44 will maintain its centered position. The markings on plate 48 will indicate the satisfactory state-of-charge.

If the bottle system should begin to leak the pressure in bellows 26 will begin to drop. Bellows 34 pressure will move element 44 to the left until the pressures in the two bellows equalize. An unacceptable low state-of-charge will be observable on dial plate 48.

In situations where the fire suppressant bottle is not easily observed, it may be desired to have a remote readout of the bottle state-of-charge. FIG. 1 of the drawings shows one possible mechanism for generating an electrical signal that can be transmitted to an area remote from the bottle, e.g., a buzzer, light, etc., located on the vehicle instrument panel. The signal-generating mechanism is shown as an electrical snap switch 60 having a spring leaf arm 62 that carries a small roller 64.

Roller 64 is located in the path of indicator element 44, such that when the element moves to the left a distance representative of an unsatisfactory state-of-charge the roller is deflected; leaf arm 62 moves plunger 66 into the switch housing, thereby energizing an alarm or alert circuit. Instead of a switch, the signal-generating mechanism could be a potentiometer, resolver or synchro. My invention is concerned primarily with the bellows arrangement which provides the desired indicator motion responsive to loss of charge in the bottle system. The invention is perceived as being primarily useful in fire suppression bottle systems. There may be other systems where the invention could be used, e.g., air conditioning systems.

The device shown in the drawings may be constructed as a relatively small size unit separate from the bottle system on which it is to be installed. The device is mountable externally of bottle 12 by an easily-accomplish screw-in operation, using threaded stem extension 16. As previously noted, the indicator device can be installed on a side surface of a conventional discharge valve 18 for bottle 12; no openings are required in the bottle wall for accommodation of the indicator device. The structural arrangement is believed to be somewhat simpler than the arrangement shown in previous-described U.S. Pat. No. 3,946,175 (wherein the indicator is designed for installation within the bottle, rather than outside the bottle).

It will be noted that the two bellows 26 and 34 effectively seal their operating fluids from contact with switch 60 (or any other equivalent device that might be employed in housing 14). The housing space external to the two bellows is at atmospheric pressure; switch 60 can be an inexpensive structure devoid of special sealing devices.

It will also be noted that should either bellows fail there will be an indication of the failure on the dial plate. This is not believed to be true of the device disclosed in U. S. Pat. No. 3,946,175. Should bellows 32 in U.S. Pat. No. 3,946,175 fail the bottle pressure will equalize across the bellows, causing the indicator to incorrectly denote a "safe" condition. My proposed arrangement is believed to offer greater fail-safe assurance than the arrangement illustrated in U.S. Pat. No. 3,946,175.

I wish it to be understood that I do not desire to be limited to the exact details of construction shown and described for obvious modifications will occur to a person skilled in the art, without departing from the spirit and scope of the appended claims.

I claim:

1. In association with a fire suppression bottle charged with a vaporizable liquid fire extinguishant under pressure; said bottle being designed for use in a vehicle that can be located in desert atmospheres where the temperature is relatively hot or in arctic atmospheres where the temperature is relatively cold, whereby the extinguishant pressure can vary within wide extremes without rendering the bottle inoperable for fire suppression purposes: the improvement comprising a state-of-charge indicator device connected to the bottle for detecting leakage of extinguishant out of the bottle; said indicator device comprising a housing having two opposed walls; a first bellows located within the housing, with one end thereof secured to one of the aforementioned housing walls; a second sealed bellows located within the housing, with one end thereof secured to the other of the aforementioned housing walls; said first and second bellows being substantially indentical as respects length in the free state, number of convolutions, spring rate, and effective area; said first and second bellows being arranged in axial alignment with one another so that the other ends thereof are in close adjacency to one other; an indicator element operatively connected to the other ends of the bellows, whereby when the pressure within the first bellows is greater than the pressure within the second bellows the indicator element is moved in a first direction, and when the pressure within the second bellows is greater than the pressure within the first bellows the indicator element is moved in a second direction; a passage means extending within the housing, said passage means operably connecting the interior of the first bellows to the interior of the aforementioned fire suppression bottle, whereby said first bellows applies a force on the indicator element proportional to the pressure of the fire extinguishant within the bottle; and a second vaporizable liquid charged into the second liquid bellows under pressure, said second liquid and associated pressurization agent having the same pressure-temperature response characteristic as the bottle liquid; the pressurized liquid in the second bellows causing the second bellows to apply a force on the indicator element in direct opposition to the force developed on the indicator element by the first bellows; the charge within the second bellows being sufficient so that when the bottle is properly charged, the indicator element will take a predetermined position wherein it can move in the first direction or the second direction; said one end of the second sealed bellows having a port (50) therein connected to a fluid-admission passage (51) to define a shoulder (57), and a deformable sealing member (52) located in the port in engagement with the shoulder to maintain the bellows in a sealed condition.

2. The improvement of claim 1: said deformable sealing member being spherical in its undeformed state; the diameter of the spherical element being less than the diameter of the port, whereby when the spherical sealing member is forced away from the shoulder fluid is enabled to flow into the second bellows through the annular space between the spherical element and port surface.

3. The improvement of claim 1: said one end of the first bellows being defined by an axially thickened end wall (24), said axially thickened end wall being seated within a circular opening in the associated housing wall; said thickened wall having a flow duct (28) therein extending from its peripheral edge to the bellows interior space, said flow duct being operatively connected to the aforementioned passage means for transmitting bottle pressure into the second bellows.

4. In association with a closed system charged with a vaporizable liquid under pressure; said system being subject to substantial temperature changes; the improvement comprising a state-of-charge indicator device connected to the closed system for detecting leakage of vaporizable liquid out of the system; said indicator device comprising a housing; a first bellows located within the housing; passage means connecting the interior of said first bellows to the closed system, whereby the bellows internal pressure is the same as that of the system; a second sealed bellows located within the housing in axial alignment with the first bellows; an indicator element located between the two bellows, whereby said element is moved in a first direction when the pressure within the first bellows is greater than the pressure within the second bellows, and said element is moved in a second direction when the pressure within the second bellows is greater than the pressure within the first bellows; and a second vaporizable liquid charged into the second sealed bellows under pressure; said second liquid having the same pressure-temperature response characteristic as the vaporizable liquid in the closed system, whereby the two bellows exert similar opposing forces on the indicator element when the closed system is in a non-leaking condition; the first and second bellows being substantially indentical as respects length in the free state, number of convolutions, spring rate, and effective area; said second bellows having a first axially thickened end wall mounted to the housing, and a second movable end wall operatively engaged with the indicator element; said first end wall having a port (50) and fluid-admission passage (51) therein, the juncture between said port and passage defining a shoulder; and a deformable spherical sealing element located in the port in sealing engagement with the shoulder to maintain the second bellows in a sealed condition.

5. In association with a fire suppression bottle charged with a vaporizable liquid fire extinguishant under pressure; said bottle being designed for use in a vehicle that can be located in desert atmospheres where the temperature is relatively hot or in arctic atmospheres where the temperature is relatively cold, whereby the extinguishant pressure can vary within wide extremes without rendering the bottle inoperable for fire suppression purposes; said bottle having a discharge valve thereon controlling flow of extinguishant out of the bottle: the improvement comprising a state-of-charge indicator device connected to the discharge valve for detecting leakage of extinguishant out of the bottle; said indicator device comprising a housing located closely adjacent an exterior face of the discharge valve; said housing having two opposed walls; a first bellows located within the housing, with one end thereof secured to one of the aforementioned housing walls; a second sealed bellows located within the housing, with one end thereof secured to the other of the aforementioned housing walls; said first and second bellows being substantially identical as respects length in the free state, number of convolutions, spring rate, and effective area; said first and second bellows being arranged in axial alignment with one another so that the other ends thereof are in close adjacency to one other; an indicator element operatively connected to the other end of the bellows, whereby when the pressure within the first bellows is greater than the pressure within the second bellows the indicator element is moved in a first direction, and when the pressure within the second bellows is greater than the pressure within the first bellows the indicator element is moved in a second direction; a passage means (20, 28) extending within the housing, said passage means operably connecting the interior of the first bellows to the interior of the aforementioned fire suppression bottle via the discharge valve, whereby said first bellows applies a force on the indicator element proportional to the pressure of the fire extinguishant within the bottle; and a second vaporizable liquid charged into the second liquid bellows under pressure, said second liquid and associated pressurization agent having the same pressure-temperature response characteristic as the bottle liquid; the pressurized liquid in the second bellows causing the second bellows to apply a force on the indicator element in direct opposition to the force developed on the indicator element by the first bellows; the charge within the second bellows being sufficient so that when the bottle is properly charged the indicator element will take a predetermined position wherein it can move in the first direction or the second direction.

* * * * *